(12) United States Patent
Huang et al.

(10) Patent No.: US 9,355,666 B1
(45) Date of Patent: May 31, 2016

(54) DISK DRIVE MEASURING STROKE DIFFERENCE BETWEEN HEADS BY DETECTING A DIFFERENCE BETWEEN RAMP CONTACT

(71) Applicant: Western Digital Technologies, Inc., Irvine, CA (US)

(72) Inventors: Yanan Huang, Torrance, CA (US); Zhenyu Zhang, Irvine, CA (US); Chuanwen Ji, Irvine, CA (US); Duc T. Phan, Saratoga, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/733,027

(22) Filed: Jun. 8, 2015

Related U.S. Application Data

(63) Continuation-in-part of application No. 14/040,960, filed on Sep. 30, 2013, now Pat. No. 9,064,537.

(51) Int. Cl.
  *G11B 5/09* (2006.01)
  *G11B 5/596* (2006.01)

(52) U.S. Cl.
  CPC .................................. *G11B 5/59627* (2013.01)

(58) Field of Classification Search
  None
  See application file for complete search history.

(56) References Cited

U.S. PATENT DOCUMENTS

| | | | |
|---|---|---|---|
| 4,321,517 A | 3/1982 | Touchton et al. | |
| 4,353,101 A * | 10/1982 | Kawai | G11B 15/6658 360/85 |
| 4,491,885 A * | 1/1985 | Morikawa | G11B 15/6655 360/85 |
| 4,532,802 A | 8/1985 | Yeack-Scranton et al. | |
| 4,591,937 A * | 5/1986 | Nakarai | G06K 7/084 360/101 |
| 4,691,152 A | 9/1987 | Ell et al. | |
| 4,908,723 A * | 3/1990 | Ohyama | G11B 15/1883 360/85 |
| 5,075,805 A | 12/1991 | Peddle et al. | |
| 5,113,296 A * | 5/1992 | Kaneko | G11B 15/43 360/85 |
| 5,384,675 A | 1/1995 | Crawforth et al. | |
| 5,455,723 A | 10/1995 | Boutaghou et al. | |
| 5,485,323 A | 1/1996 | Anderson et al. | |
| 5,559,648 A | 9/1996 | Hunter et al. | |
| 5,576,906 A | 11/1996 | Fisher et al. | |
| 5,668,679 A | 9/1997 | Swearingen et al. | |
| 5,754,353 A | 5/1998 | Behrens et al. | |
| 5,761,212 A | 6/1998 | Foland, Jr. et al. | |
| 5,781,363 A | 7/1998 | Rowan et al. | |
| 5,828,522 A | 10/1998 | Brown et al. | |
| 5,831,888 A | 11/1998 | Glover | |
| 5,973,870 A | 10/1999 | Boutaghou et al. | |
| 6,000,282 A | 12/1999 | Ku et al. | |
| 6,005,725 A * | 12/1999 | Emo | G11B 5/00 360/31 |
| 6,018,789 A | 1/2000 | Sokolov et al. | |
| 6,021,012 A | 2/2000 | Bang | |

(Continued)

OTHER PUBLICATIONS

U.S. Appl. No. 11/760,601, filed Jun. 8, 2007, 24 pages.

(Continued)

*Primary Examiner* — Peter Vincent Agustin

(57) ABSTRACT

A data storage device is disclosed comprising a plurality of disk surfaces including a first disk surface and a second disk surface. A first head is actuated over the first disk surface, and a second head is actuated over the second disk surface. A ramp is located proximate an outer diameter of the disk surfaces. A stroke difference between the first and second heads is measured by moving the first and second heads toward the ramp and detecting when the heads contact the ramp.

26 Claims, 8 Drawing Sheets

(56) References Cited

U.S. PATENT DOCUMENTS

| | | |
|---|---|---|
| 6,023,386 A | 2/2000 | Reed et al. |
| 6,065,095 A | 5/2000 | Sokolov et al. |
| 6,078,452 A | 6/2000 | Kittilson et al. |
| 6,081,447 A | 6/2000 | Lofgren et al. |
| 6,091,564 A | 7/2000 | Codilian et al. |
| 6,092,149 A | 7/2000 | Hicken et al. |
| 6,092,150 A | 7/2000 | Sokolov et al. |
| 6,092,412 A | 7/2000 | Flechsig et al. |
| 6,094,707 A | 7/2000 | Sokolov et al. |
| 6,105,104 A | 8/2000 | Guttmann et al. |
| 6,111,717 A | 8/2000 | Cloke et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,249,896 B1 | 6/2001 | Ho et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,318 B1 | 9/2001 | Hayashi |
| 6,292,912 B1 | 9/2001 | Cloke et al. |
| 6,304,407 B1 | 10/2001 | Baker et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,453 B1 | 6/2002 | Chainer et al. |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,429,989 B1 | 8/2002 | Schultz et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,507,450 B1 | 1/2003 | Elliott |
| 6,519,104 B1 | 2/2003 | Cloke et al. |
| 6,519,107 B1 | 2/2003 | Ehrlich et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,549,377 B2 | 4/2003 | Yoshida et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,563,660 B1 | 5/2003 | Hirano et al. |
| 6,578,106 B1 | 6/2003 | Price |
| 6,580,573 B1 | 6/2003 | Hull et al. |
| 6,587,293 B1 | 7/2003 | Ding et al. |
| 6,590,732 B2 | 7/2003 | Kitagawa et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,636,377 B1 | 10/2003 | Yu et al. |
| 6,639,748 B1 | 10/2003 | Christiansen et al. |
| 6,643,088 B1 | 11/2003 | Kawachi |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,700,726 B1 | 3/2004 | Gillis et al. |
| 6,704,153 B1 | 3/2004 | Rothberg et al. |
| 6,704,156 B1 | 3/2004 | Baker et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,721,119 B1 | 4/2004 | Hassan et al. |
| 6,721,121 B1 | 4/2004 | Schreck et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,738,205 B1 | 5/2004 | Moran et al. |
| 6,744,772 B1 | 6/2004 | Eneboe et al. |
| 6,745,283 B1 | 6/2004 | Dang |
| 6,751,402 B1 | 6/2004 | Elliott et al. |
| 6,754,027 B2 | 6/2004 | Hirano et al. |
| 6,757,481 B1 | 6/2004 | Nazarian et al. |
| 6,771,480 B2 | 8/2004 | Brito |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,007 B1 | 11/2004 | Patton, III |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,867,944 B1 | 3/2005 | Ryan |
| 6,880,043 B1 | 4/2005 | Castro et al. |
| 6,882,486 B1 | 4/2005 | Kupferman |

(56) References Cited

U.S. PATENT DOCUMENTS

| | | |
|---|---|---|
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,902,007 B1 | 6/2005 | Orr et al. |
| 6,910,099 B1 | 6/2005 | Wang et al. |
| 6,917,489 B2 | 7/2005 | Lee |
| 6,920,007 B2 | 7/2005 | Tominaga et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,937,419 B2 | 8/2005 | Suk et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,977,791 B2 | 12/2005 | Zhu et al. |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,019,932 B2 | 3/2006 | Hirano et al. |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,474 B2 | 5/2006 | Kuramoto et al. |
| 7,046,475 B2 | 5/2006 | Hosokawa |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,068,459 B1 | 6/2006 | Cloke et al. |
| 7,075,746 B1 | 7/2006 | Kupferman |
| 7,076,604 B1 | 7/2006 | Thelin |
| 7,082,494 B1 | 7/2006 | Thelin et al. |
| 7,088,533 B1 | 8/2006 | Shepherd et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,113,361 B2 | 9/2006 | Hassan |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,159,299 B1 | 1/2007 | McMunigal et al. |
| 7,171,108 B1 | 1/2007 | Masters et al. |
| 7,171,110 B1 | 1/2007 | Wilshire |
| 7,177,111 B2 | 2/2007 | Gururangan et al. |
| 7,190,547 B2 | 3/2007 | Khurshudov et al. |
| 7,194,576 B1 | 3/2007 | Boyle |
| 7,199,960 B1 | 4/2007 | Schreck et al. |
| 7,200,698 B1 | 4/2007 | Rothberg |
| 7,203,019 B1 | 4/2007 | Liu et al. |
| 7,205,805 B1 | 4/2007 | Bennett |
| 7,206,497 B1 | 4/2007 | Boyle et al. |
| 7,209,310 B1 | 4/2007 | Tsai et al. |
| 7,215,496 B1 | 5/2007 | Kupferman et al. |
| 7,215,504 B1 | 5/2007 | Bennett |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,527 B2 | 9/2007 | Calfee et al. |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,295,395 B2 | 11/2007 | Koh et al. |
| 7,296,284 B1 | 11/2007 | Price et al. |
| 7,302,501 B1 | 11/2007 | Cain et al. |
| 7,302,579 B1 | 11/2007 | Cain et al. |
| 7,317,587 B2 | 1/2008 | Furuhashi et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,391,586 B2 | 6/2008 | Keast |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,486,466 B2 | 2/2009 | Hara et al. |
| 7,496,493 B1 | 2/2009 | Stevens |
| 7,502,194 B2 | 3/2009 | Alexander et al. |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,599,257 B2 * | 10/2009 | Suzuki ............... G11B 7/00736 369/44.26 |

(56) References Cited

U.S. PATENT DOCUMENTS

| | | |
|---|---|---|
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,843,662 B1 | 11/2010 | Weerasooriya et al. |
| 7,852,596 B2 | 12/2010 | Boyle et al. |
| 7,859,782 B1 | 12/2010 | Lee |
| 7,869,155 B1 | 1/2011 | Wong |
| 7,869,164 B2 * | 1/2011 | Shin ................. G11B 5/4846 360/264.2 |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,300,438 B1 | 10/2012 | Herbert |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,005 B1 | 11/2012 | Zou et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,547,657 B1 * | 10/2013 | Liu ................. G11B 5/4873 360/31 |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,634,283 B1 | 1/2014 | Rigney et al. |

(56) References Cited

U.S. PATENT DOCUMENTS

| | | |
|---|---|---|
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 9,064,537 B1 | 6/2015 | Nie et al. |
| 2002/0012193 A1* | 1/2002 | Kobayashi ............ G11B 5/5552 360/78.05 |
| 2002/0071219 A1 | 6/2002 | Yoshida et al. |
| 2002/0181139 A1 | 12/2002 | Weiehelt et al. |
| 2004/0179289 A1 | 9/2004 | Suk et al. |
| 2005/0152060 A1 | 7/2005 | Gururangan et al. |
| 2005/0198656 A1* | 9/2005 | Yamamoto ......... G11B 17/0515 720/616 |
| 2005/0280916 A1 | 12/2005 | Calfee et al. |
| 2006/0005403 A1 | 1/2006 | Calfee et al. |
| 2006/0028933 A1* | 2/2006 | Liu ..................... G11B 7/08588 369/44.27 |
| 2007/0076317 A1 | 4/2007 | Keast |
| 2007/0230017 A1* | 10/2007 | Hiller ................. G11B 5/59627 360/75 |
| 2007/0263522 A1* | 11/2007 | Yamamoto ............ G11B 7/0935 369/112.23 |
| 2008/0002274 A1 | 1/2008 | Allen et al. |
| 2008/0279060 A1* | 11/2008 | Nishi ..................... G02B 7/021 369/44.37 |
| 2008/0291564 A1 | 11/2008 | Tang et al. |
| 2009/0113702 A1 | 5/2009 | Hogg |
| 2010/0053798 A1* | 3/2010 | Saga ..................... G11B 5/596 360/75 |
| 2010/0306551 A1 | 12/2010 | Meyer et al. |
| 2010/0309574 A1 | 12/2010 | Bahirat et al. |
| 2011/0226729 A1 | 9/2011 | Hogg |
| 2012/0127614 A1* | 5/2012 | Arai ..................... G11B 5/4873 360/244.2 |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0286807 A1* | 10/2013 | Gao ....................... G11B 5/314 369/13.33 |

OTHER PUBLICATIONS www.microesys.com/dataStorage/specifications.html.
http://www.microesys.com/pdf/pa2000.pdf, "PA 2000 High Performance Positioning System for Servotrack Writers", MicroE Systems, PA2000 Rev.S1, 2 pages.
Notice of Allowance dated Feb. 25, 2015 from U.S. Appl. No. 14/040,960, 5 pages.
Office Action dated Nov. 6, 2014 from U.S. Appl. No. 14/040,960, 5 pages.
Office Action dated Aug. 7, 2014 from U.S. Appl. No. 14/040,960, 6 pages.
Office Action dated Apr. 7, 2014 from U.S. Appl. No. 14/040,960, 5 pages.

* cited by examiner

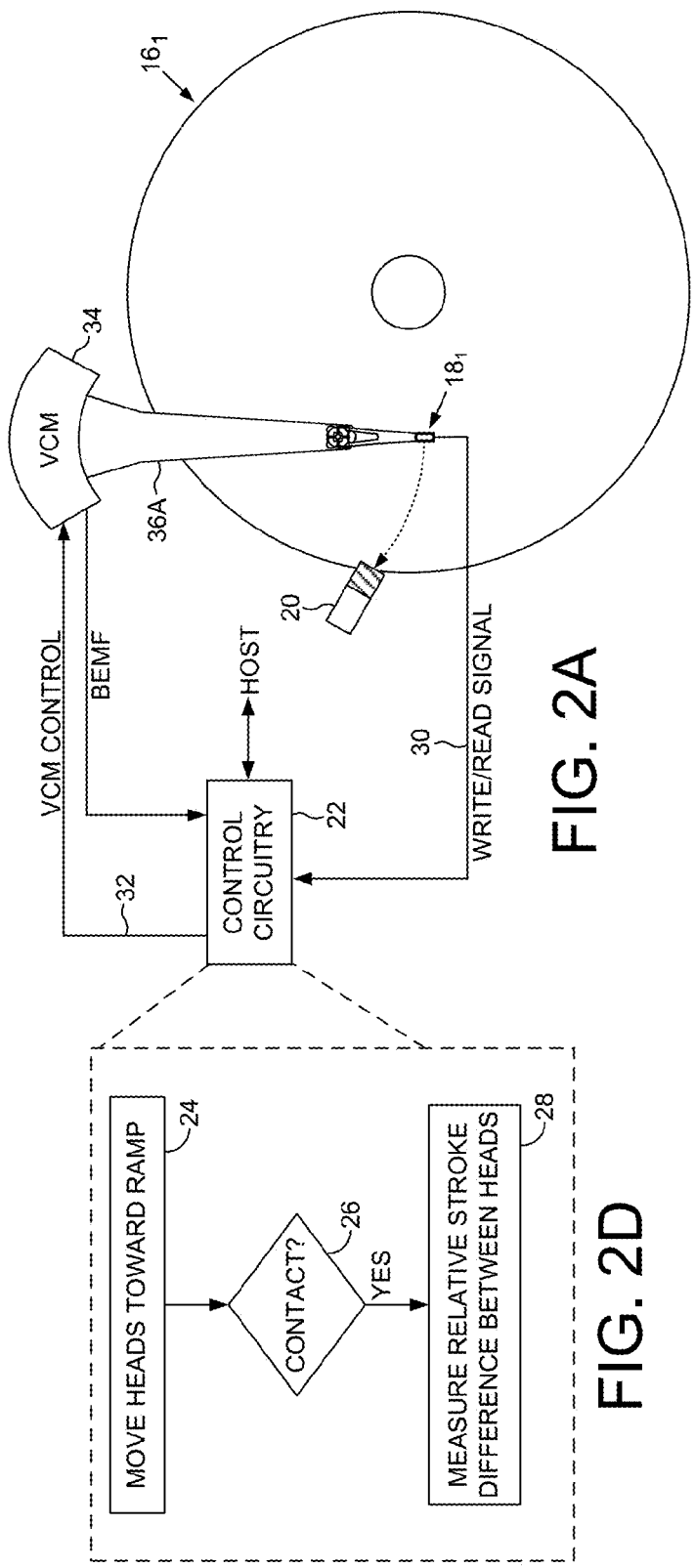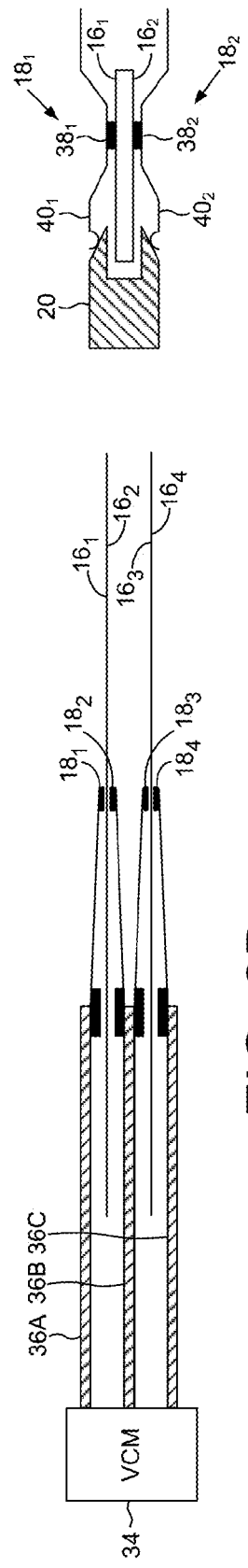

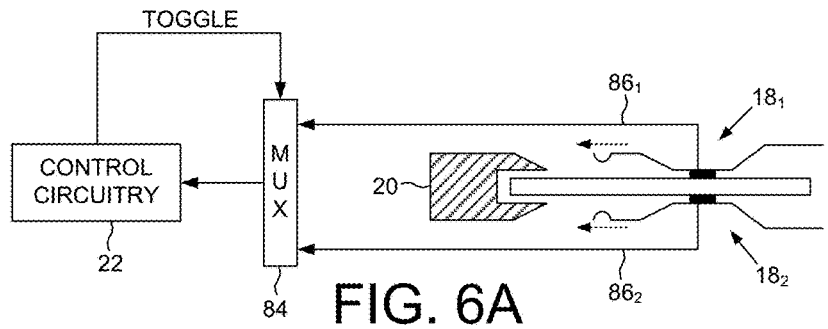
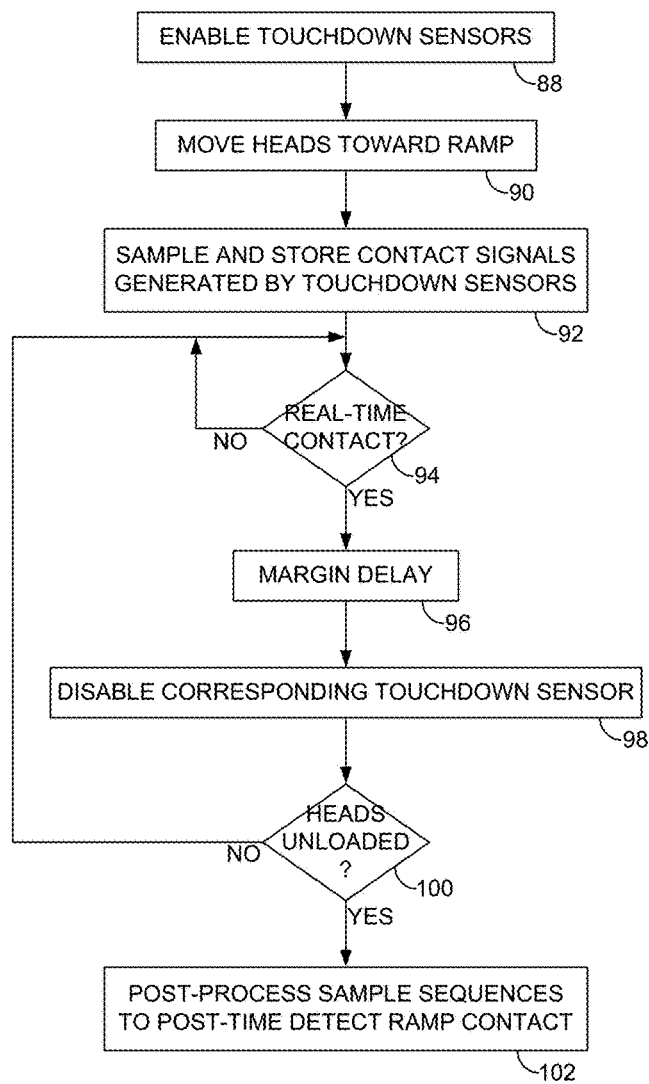
FIG. 6A
FIG. 6B

DISK DRIVE MEASURING STROKE DIFFERENCE BETWEEN HEADS BY DETECTING A DIFFERENCE BETWEEN RAMP CONTACT

CROSS-REFERENCE TO RELATED APPLICATIONS

This application is a continuation-in-part of U.S. patent application Ser. No. 14/040,960, filed on Sep. 30, 2013, entitled "DISK DRIVE MEASURING RADIAL OFFSET BETWEEN HEADS BY DETECTING A DIFFERENCE BETWEEN RAMP CONTACT," which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIGS. 2A and 2B show a data storage device in the form of a disk drive according to an embodiment comprising a plurality of disk surfaces wherein a head is actuated over each disk surface by a voice coil motor (VCM).

FIG. 2C shows top and bottom heads according to an embodiment each comprising a slider coupled to a suspension and a lift tab at the distal end of the suspension for contacting the ramp.

FIG. 2D is a flow diagram according to an embodiment wherein the heads are moved toward a ramp and a stroke difference between the heads is measured based on when the ramp contact occurs.

FIG. 6A shows an embodiment wherein the control circuitry toggles between evaluating a first contact signal generated by the first head and a second contact signal generated by the second head.

FIG. 6B is a flow diagram according to an embodiment wherein the control circuitry real-time detects when each head contacts the ramp in order to disable the touchdown sensor, and then post-time detects when each head contacts the ramp by post-processing the stored sample sequence of the contact signal.

DETAILED DESCRIPTION

Figure 1:
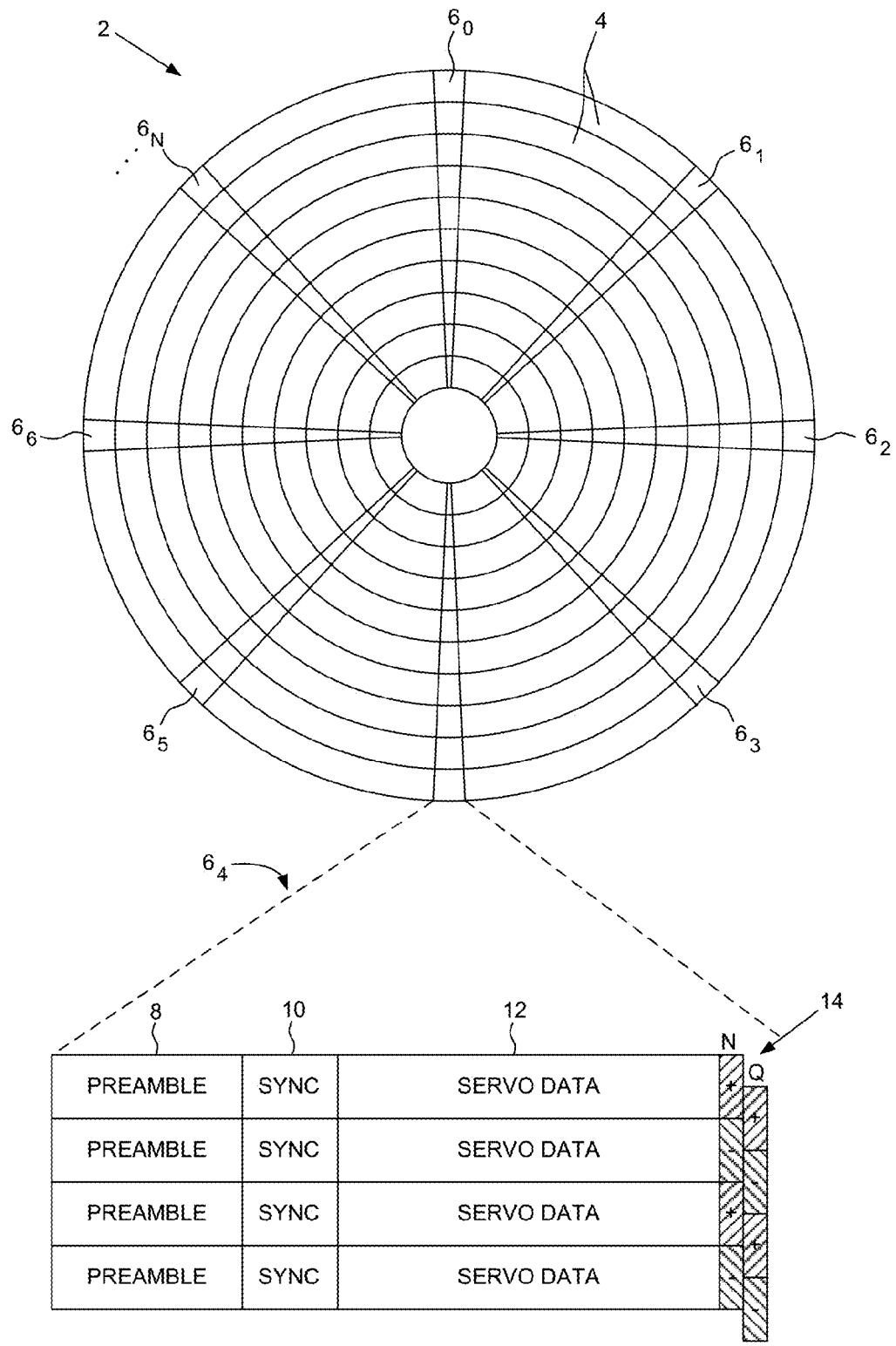
FIG. 1 shows a prior art disk format comprising a plurality of servo tracks defined by servo sectors.

FIGS. 2A-2C show a data storage device in the form of a disk drive according to an embodiment comprising a plurality of disk surfaces including a first disk surface $16_1$ and a second disk surface $16_2$. A first head $18_1$ is actuated over the first disk surface $16_1$, and a second head $18_2$ is actuated over the second disk surface $16_2$. A ramp 20 is located proximate an outer diameter of the disk surfaces. The disk drive further comprises control circuitry 22 configured to execute the flow diagram of FIG. 2D wherein a stroke difference between the first and second heads is measured (block 28) by moving the first and second heads toward the ramp (block 24) and detecting when the heads contact the ramp (block 26).

In the embodiment of FIG. 2A, each disk surface may comprise servo data such as a plurality of servo sectors that define a plurality of servo tracks, wherein data tracks may be defined relative to the servo tracks at the same or different radial density. The control circuitry 22 processes a read signal 30 emanating from a head to demodulate the servo sectors and generate a position error signal (PES) representing an error between the actual position of the head and a target position relative to a target track. The control circuitry 22 filters the PES using a suitable compensation filter to generate a control signal 32 applied to a voice coil motor (VCM) 34 which rotates an actuator arm (e.g., 36A) about a pivot in order to actuate the heads radially over the disk surfaces in a direction that reduces the PES. The servo sectors may comprise any suitable head position information, such as a track address for coarse positioning and servo bursts for fine positioning. The servo bursts may comprise any suitable pattern, such as an amplitude based servo pattern or a phase based servo pattern.

Each head (e.g., first head $18_1$) at the distal end of the actuator arm may comprise any suitable components. In the embodiment shown in FIG. 2C, each head comprises a slider (e.g., first slider $38_1$) coupled to a suspension, wherein the suspension comprises a lift tab (e.g., first lift tab $40_1$) at the distal end of the suspension for contacting the ramp 20. In one embodiment, the stroke difference between the heads may provide information about certain manufacturing defects of the disk drive. For example, the stroke difference may indicate a manufacturing defect in the ramp 20 (e.g., a tilt), or a manufacturing defect in the actuator arm and/or suspension (e.g., a tilt). The stroke difference may also reflect a defect in one or more of the disks, such as a vertical offset relative to the ramp 20, a tilt in one or more of the disks, or a warping/wobbling of one or more of the disks. These and other manufacturing defects may cause each head to contact the ramp 20 at different times during an unload operation due to the stroke difference between the heads as measured from a reference location. In one embodiment, the measured stroke difference between the heads may exhibit a particular signature corresponding to each type of manufacturing defect. Accordingly, in one embodiment the signature of the measured stroke difference may be used to discard or rework defective disk drives, and/or used as feedback to modify and improve certain manufacturing processes.

Figure 3A:
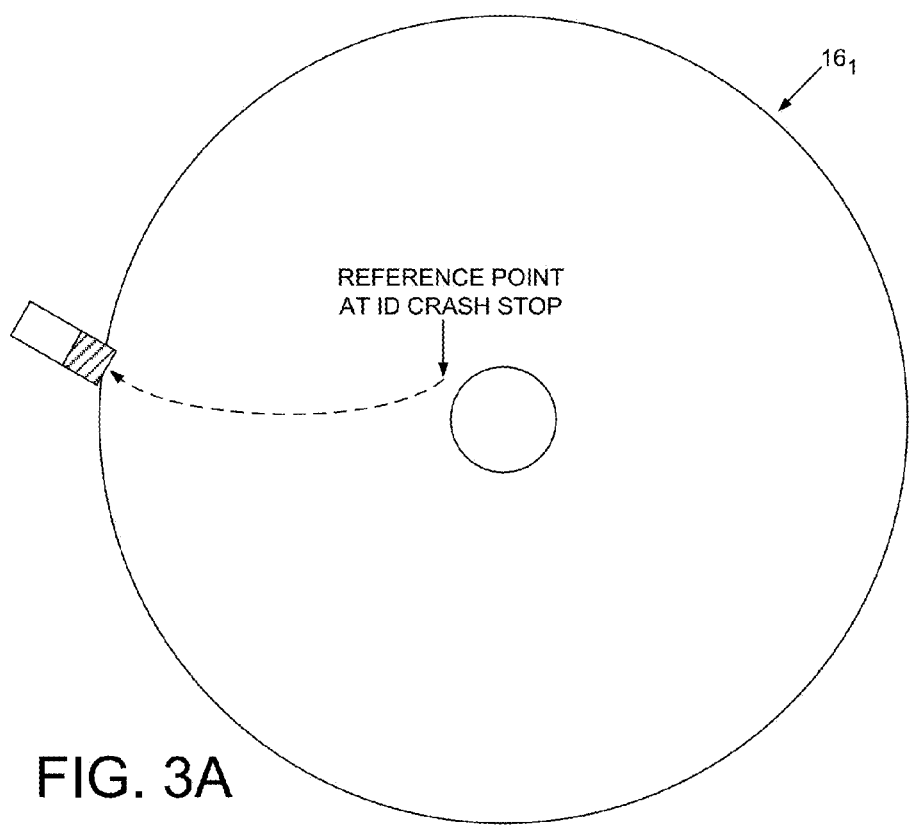
FIG. 3A shows an embodiment wherein the heads are moved from an inner diameter of the disk to the ramp.

FIG. 3A illustrates an embodiment wherein the control circuitry 22 rotates the head stack assembly shown in FIG. 2B until it presses against an inner diameter crash stop so that the heads are positioned at a starting reference position near the inner diameter of the disk surfaces. The control circuitry 22 then rotates the head stack assembly in the opposite direction so that the heads moves toward the ramp 20. While moving the heads toward the ramp 20, a first interval is measured until the first head $18_1$ contacts the ramp 20. The control circuitry 22 then rotates the head stack assembly back until it again presses against the inner diameter crash stop, and then performs the same operation in order to measure the second interval for the second head, and so on for each head. After measuring the interval for each head, the control circuitry 22 may evaluate the intervals in order to measure the stroke difference between the heads.

Figure 3B:
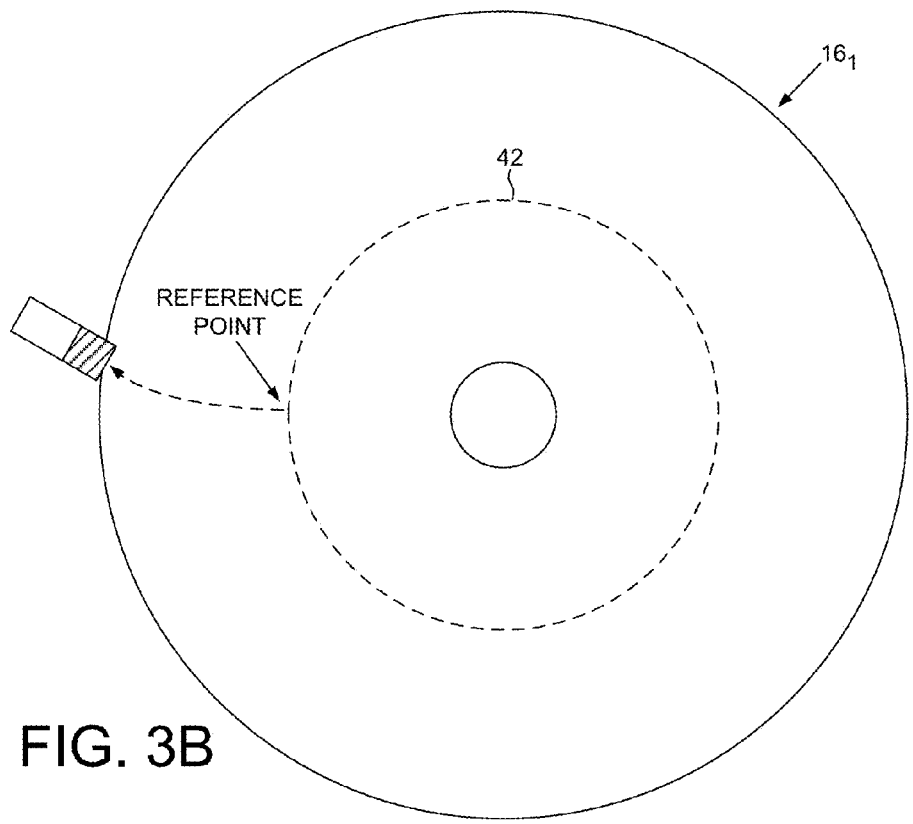
FIG. 3B shows an embodiment wherein the heads are moved from a radial location identified by a reference track to the ramp.

The interval required for each head to contact the ramp 20 may be measured relative to any suitable reference point. FIG. 3B illustrates an embodiment wherein the heads may be moved starting from a radial location on one of the disk surfaces (e.g., the first disk surface $16_1$) which may be defined by suitable reference servo data, such as a reference servo track 42 defined by servo sectors. In one embodiment, the reference servo track 42 may be written to the first disk surface $16_1$ prior to servo writing the disk surface with, for example, servo sectors that define concentric servo tracks as shown in FIG. 1. Alternatively, the reference servo track 42 may comprise one of the concentric servo tracks after having servo written the first disk surface $16_1$. In one embodiment, the control circuitry 22 positions all of the heads at the reference position by servoing the first head $18_1$ over the first disk surface $16_1$ until the first head $18_1$ is positioned over the reference servo track 42. The control circuitry 22 then moves all the heads toward the ramp 20 while evaluating a suitable contact signal generated for one of the heads that indicates when the head has contacted the ramp 20.

In one embodiment, when moving all the heads relative to a reference point on the first disk surface $16_1$, the first disk surface $16_1$ may comprise any suitable servo data disbursed at any suitable frequency on the first disk surface $16_1$. For example, the first disk surface $16_1$ may comprise multiple reference servo tracks (such as reference servo track 42 in FIG. 3B) that are spaced radially across the disk surface. When the first head $18_1$ is moved toward the ramp 20, the periodic servo data written on the first disk surface $16_1$ may be read by the first head $18_1$ in order to adjust a seek trajectory for the heads during the seek toward the ramp 20. In this embodiment, the interval for each head to contact the ramp 20 may be measured relative to the last reference point read from the first disk surface $16_1$. In one embodiment, the servo data on the first disk surface $16_1$ may comprise a spiral track, wherein a reference point may be generated each time the head crosses the spiral track. In yet another embodiment, the servo data written on the first disk surface $16_1$ may comprise a full set of servo written concentric servo tracks such as shown in FIG. 1, wherein the reference point for measuring the interval may be the last concentric servo track detected on the first disk surface $16_1$ before each head contacts the ramp 20.

Figure 4A:
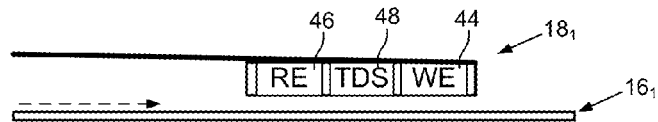
FIG. 4A shows a head according to an embodiment comprising a write element, a read element, and a touchdown sensor.

Any suitable contact signal may be generated in order to detect when one of the heads contacts the ramp 20. For example, in one embodiment the read signal emanating from the head may indicate when the head contacts the ramp 20. In another embodiment illustrated in FIG. 4A, each head may be fabricated with a suitable write element 44, a suitable read element 46, and a suitable fly height sensor or touchdown sensor 48 (e.g., a capacitive or magnetoresistive element) for generating a contact signal that may indicate when each head contacts the ramp 20. In yet another embodiment, the disk drive may employ a suitable microactuator (e.g., a piezoelectric actuator) for actuating each head over the respective disk surface in fine movements, wherein the microactuator may actuate the head in any suitable manner, such as by actuating a suspension relative to the actuator arm, or actuating the head relative to the suspension. In one embodiment, the control circuitry 22 may be configured to sense a contact signal generated by the microactuator which may indicate when the head contacts the ramp 20.

Figure 4B:
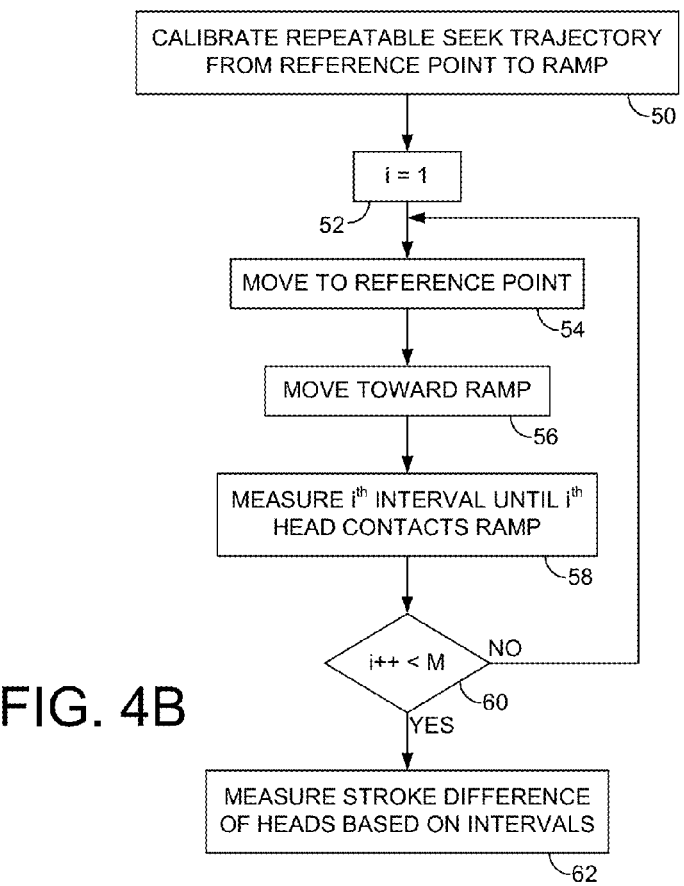
FIG. 4B is a flow diagram according to an embodiment wherein an interval for each head to contact the ramp is measured after calibrating a repeatable seek trajectory.

In one embodiment, the control circuitry 22 may evaluate the ramp contact signals generated by all of the heads concurrently while moving the head stack assembly toward the ramp 20 in a single pass. In alternative embodiment, the control circuitry 22 may evaluate the ramp contact signal generated by a single head which requires the head stack assembly to be moved toward the ramp in multiple passes (one pass for each head). This embodiment is understood with reference to the flow diagram of FIG. 4B wherein first a repeatable seek trajectory is calibrated for moving the heads from the reference point toward the ramp (block 50). Any suitable technique may be employed to calibrate the repeatable seek trajectory, such as by performing multiple seeks from the reference point to the ramp 20 and adjusting the seek trajectory (e.g., acceleration, constant velocity, and deceleration segments) until the seek time becomes substantially constant. In one embodiment, when calibrating the repeatable seek trajectory, the seek time is evaluated for a single head, such as the first head $18_1$ in the embodiments of FIG. 3A or FIG. 3B, wherein the seek time may be measured as the interval between the beginning of the seek until the first head $18_1$ contacts the ramp 20. In another embodiment, the first disk surface $16_1$ may comprise reference servo data, such as one or more concentric servo tracks or a spiral track. When calibrating the repeatable seek trajectory, the seek trajectory may be adjusted each time the first head $18_1$ crosses over the reference servo data. In this embodiment, the interval for each head to contact the ramp 20 may be measured relative to the last reference point on the first disk surface $16_1$ during the seek before the heads contact the ramp 20.

After calibrating the repeatable seek trajectory at block 38, an index i is initialized to the first head (block 52) to select the first head to measure the first interval required to move the head from the reference point until contacting the ramp. The selected head is then moved to the reference point (block 54) and then moved toward the ramp (block 56) while measuring the $i^{th}$ interval until the $i^{th}$ head contacts the ramp (block 58). The index i is incremented (block 60) and the flow diagram repeated for the next head until an interval has been measured for each head. The relative stroke difference between the heads is then measured based on the measured intervals (block 62).

Figure 4C:
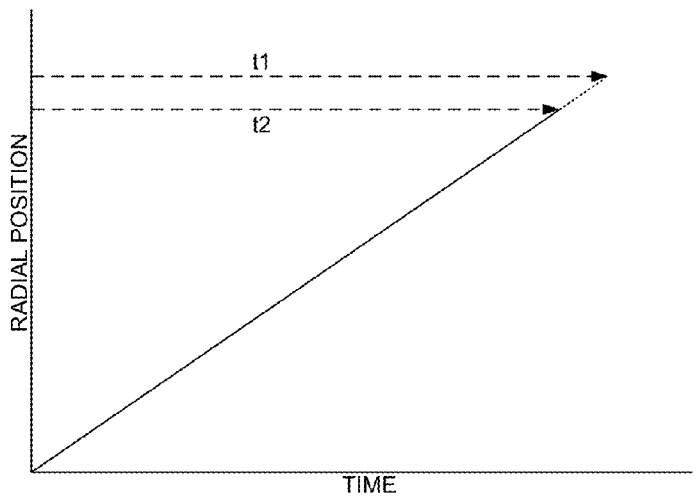
FIG. 4C illustrates a difference between measured ramp contact intervals for first and second heads which represents the radial offset between the first and second heads.

FIG. 4C illustrates a first interval (t1) measured for the first head $18_1$ and a second interval (t2) measured for the second head $18_2$. Referring to the example of FIG. 2C, a manufacturing defect as described above may cause the second head $18_2$ to contact the ramp sooner than the first head $18_1$, and therefore the second interval (t2) is shorter than the first interval (t1). The difference between the first interval (t1) and the second interval (t2) represents the stroke difference between the first head $18_1$ and the second head $18_2$. In one embodiment, the difference between the intervals may be converted into a physical distance based on the seek trajectory used to move the heads toward the ramp 20, or in an embodiment described below, based on a back electromotive force (BEMF) voltage generated by the VCM 34 which represents the velocity of the heads over the intervals.

Figure 5A:
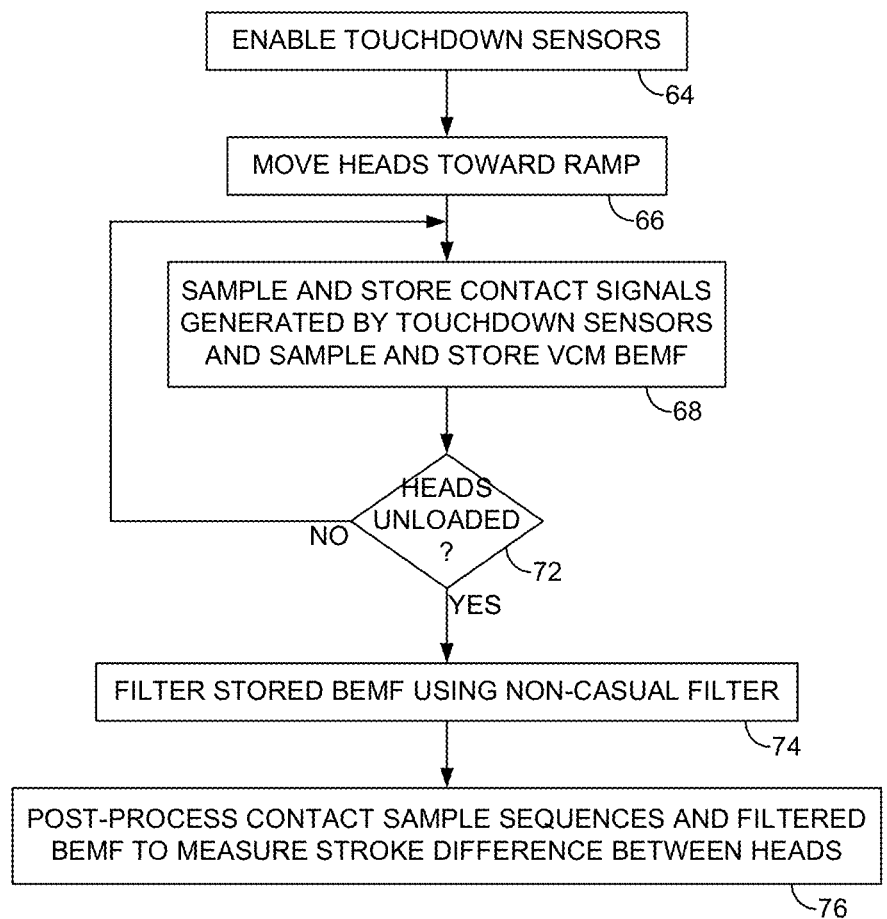
FIG. 5A is a flow diagram according to an embodiment wherein while moving the heads toward the ramp a back electromotive force (BEMF) voltage generated by the VCM is sampled/stored and then post-processed to estimate a distance of movement for each of the heads.

In one embodiment, while moving the heads toward the ramp 20 the control circuitry 22 may sample a contact signal generated by one or more heads as well as sample the BEMF voltage generated by the VCM. After the heads have been unloaded onto the ramp 20, the control circuitry 22 may post-process the contact sample sequence and the BEMF sample sequence in order to measure the stroke for the corresponding head. An example of this embodiment is shown in the flow diagram of FIG. 5A wherein prior to moving the heads (or while moving the heads) a touchdown sensor in at least one head is enabled (block 64). While moving the heads toward the ramp 20, the contact signal generated by the touchdown sensor is sampled and stored as a contact sample sequence, and the BEMF voltage generated by the VCM is sampled and stored as a BEMF sample sequence (block 68). After the heads have been unloaded onto the ramp (block 72), the BEMF sample sequence is filtered using a suitable non-causal filter (block 74) in order to attenuate noise in the BEMF sample sequence so as to provide a more accurate velocity measurement of the head. The contact sample sequence for each head and the filtered BEMF sample sequence are then post-processed to measure the stroke difference between the heads (block 76).

Figure 5B:
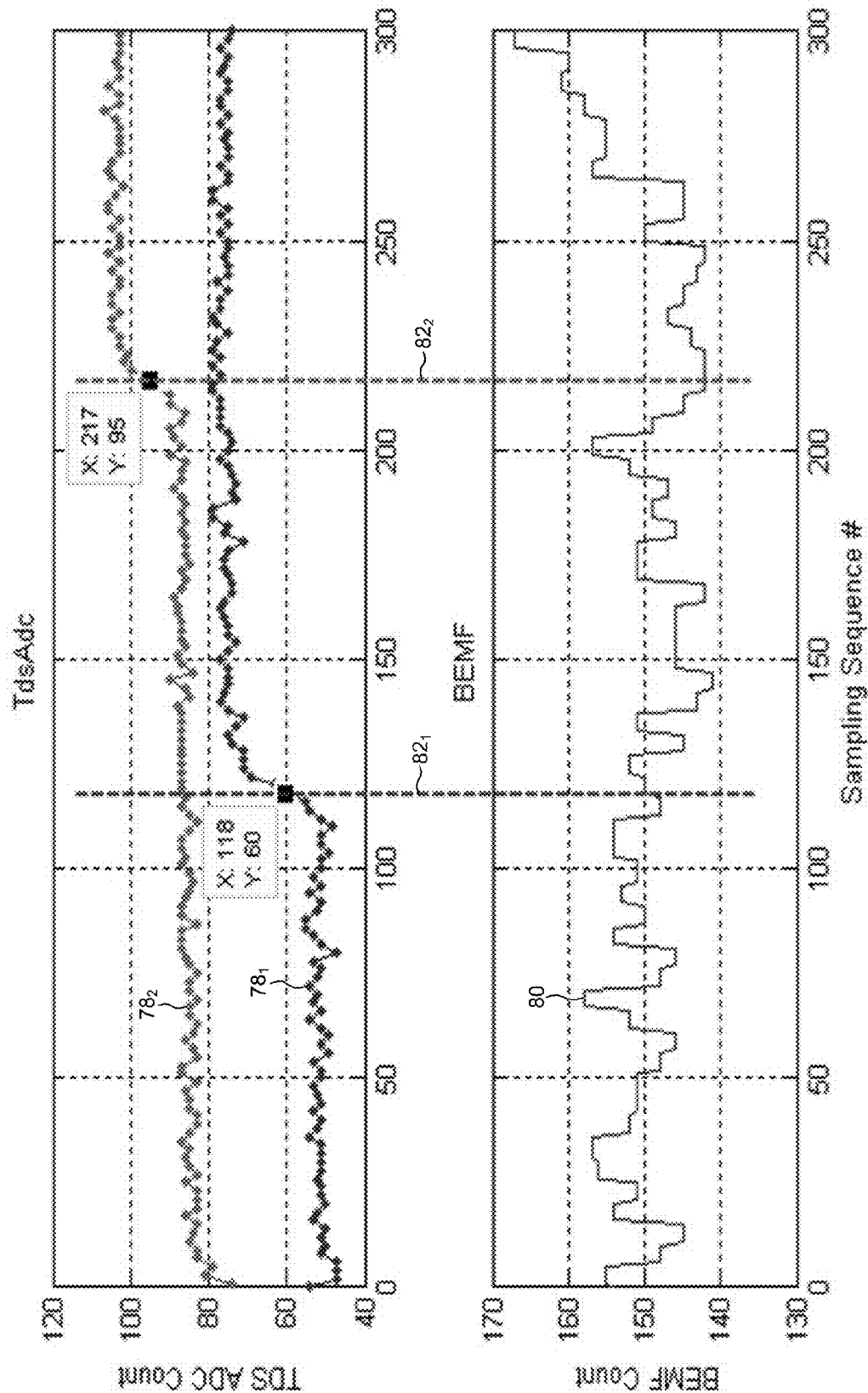
FIG. 5B illustrates an example BEMF voltage signal generated by the VCM while moving the heads toward the ramp, and the corresponding touchdown signals when each head contacts the ramp.

FIG. 5B illustrates an example first contact sample sequence $78_1$ generated for the first head and a second contact sample sequence $78_2$ generated for a second head, as well as a BEMF sample sequence 80 generated by sampling the BEMF voltage of the VCM. In this embodiment, the first and second contact sample sequences $78_1$ and $78_2$ were generated concurrently (or interleaved) and therefore both contact sample sequences correspond to the same BEMF sample sequence 80. FIG. 5B illustrates how the BEMF voltage of the VCM may vary while moving the heads toward the ramp, and therefore integrating the BEMF sample sequence over the intervals before contact provides a relatively accurate estimate of the distance traveled by each head even though the velocity of the heads may vary over the intervals. Referring again to the example of FIG. 5B, integrating the BEMF sample sequence over the interval between the ramp contact $82_1$ of the first head and the ramp contact $82_2$ of the second head provides a measurement of the stroke difference between the heads. In one embodiment, post-processing the BEMF sample sequence 80, such as by filtering the BEMF sample sequence with a non-causal filter to reduce noise, provides a more accurate estimate of the velocity over the interval, thereby improving the stroke difference measurement.

FIG. 6A illustrates an embodiment wherein while moving the first head and the second heads toward the ramp, the control circuitry 22 configures a multiplexer 84 to toggle between evaluating a first contact signal $86_1$ generated by the first head $18_1$ and a second contact signal $86_2$ generated by the second head $18_2$. The stroke difference between the first head and the second head is then measured based on when the first contact signal $86_1$ indicates contact with the ramp 20 and when the second contact signal $86_2$ indicates contact with the ramp 20. This embodiment expedites measuring the stroke difference by interleave processing the contact signals from at least two heads (e.g., top and bottom heads) while moving the heads toward the ramp. In other embodiments, the control circuitry may further expedite the process by toggling between three or more heads during a single move of the heads toward the ramp. Also in these embodiments, measuring the stroke for two or more heads during a single move of the heads toward the ramp may increase the accuracy of the measurements (as compared to measuring the stroke for each head over different move operations that may experience different disturbances).

In one embodiment, the stroke difference for each head may be measured relative to the stroke of a reference head (e.g., the first head $18_1$). For example, in one embodiment the stroke difference may be measured relative to a reference head and a target head each time the heads are moved toward the ramp. Accordingly this embodiment requires N−1 move operations in order to measure the stroke difference for N−1 target heads relative to a reference head (where N is the total number of heads).

In an embodiment that employs a touchdown sensor 48 to generate the contact signal, the touchdown sensor 48 may be damaged (e.g., due to electrical overstress) if it remains enabled while the head slides along the ramp 20 after contacting the ramp 20 during the unload operation. Accordingly, in one embodiment the touchdown sensor 48 may be disabled after contact with the ramp 20 is detected, thereby helping to prevent damage to the touchdown sensor 48. The touchdown sensor 48 may be enabled/disabled in any suitable manner, such as by enabling/disabling a bias signal (e.g., voltage or current) applied to the touchdown sensor 48.

This embodiment is understood with reference to the flow diagram of FIG. 6B wherein after enabling one or more touchdown sensors (block 88), the head are moved toward the ramp (block 90). While moving the heads toward the ramp, one or more contact signals generated by the touchdown sensors are sampled to generate contact sample sequence(s) (block 92). The contact sample sequence(s) are evaluated in real-time to detect whether the corresponding head has contacted the ramp (block 94). When the head contacting the ramp is real-time detected, the corresponding touchdown sensor is disabled (block 98), wherein in one embodiment the touchdown sensor is disabled after a margin delay (block 96) that ensures enough samples of the contact signal are taken. In an embodiment wherein two or more contact signals are evaluated during a single move toward the ramp, the process is repeated from block 94 to detect ramp contact and disable the touchdown sensor for the other heads. After the heads have been unloaded onto the ramp (block 100), the contact sample sequences are evaluated to post-time detect when each head actually contacted the ramp (block 102). That is, in one embodiment the post-time detection algorithm at block 102 is more accurate than the real-time detection algorithm at block 94.

In one embodiment, the control circuitry 22 may be configured to real-time detect one of the heads contacting the ramp based on a left peak function (LPF):

$$LPF(n) = \frac{\sum_{i=1+D}^{M+D}(x_n - x_{n-i})^2}{M}$$

where $x_n$ represents a sample of the contact sample sequence at time n, M represents a smoothing factor, and D represents a transient exclusion offset. In one embodiment, the real-time detection of the head contacting the ramp occurs when:

$$LPF(N) > G^2$$

where N represents the point of contact within the contact sample sequence and G represents a minimum jump in the contact sample sequence before and after the ramp contact.

In one embodiment, control circuitry 22 may be configured to post-time detect one of the heads contacting the ramp based on a left peak function (LPF) and a right peak function (RPF):

$$LPF(n) = \frac{\sum_{i=1}^{M}(x_n - x_{n-i})}{M} \text{ and } RPF(n) = \frac{\sum_{i=1}^{M}(x_n - x_{n+i})}{M}$$

where $x_n$ represents a sample of the contact sample sequence at time n, and M represents a smoothing factor. In one embodiment, the post-time detection of the head contacting the ramp occurs when a difference between LPF(n) and RPF(n) reaches an extremum (minimum or maximum).

Figure 7A:
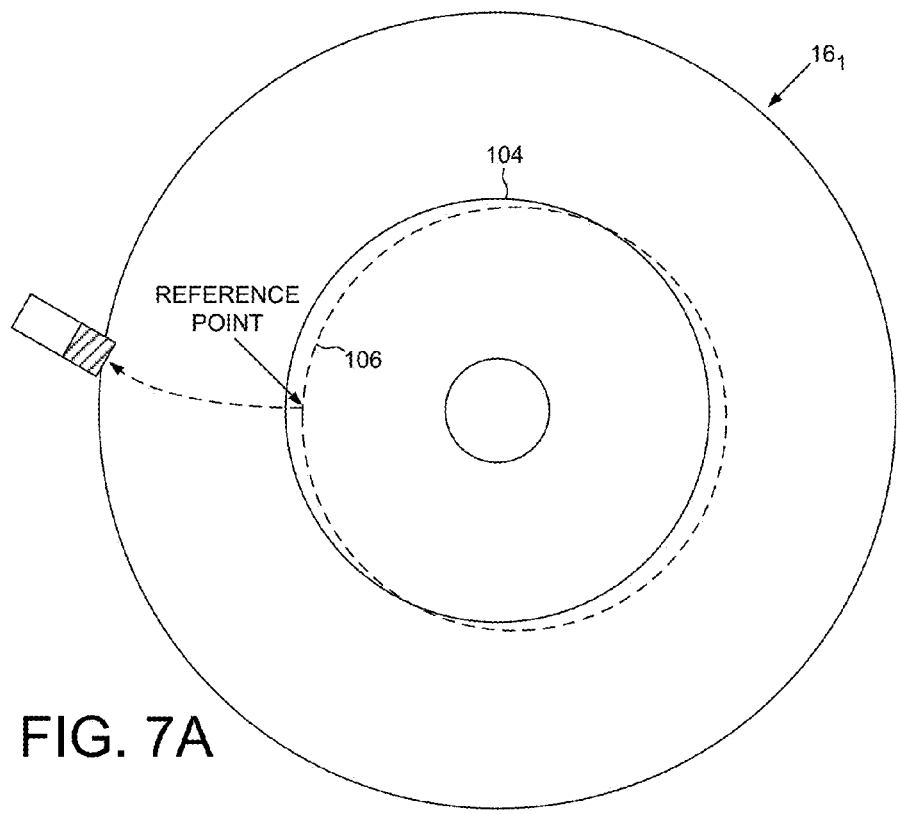
FIG. 7A shows an embodiment wherein the control circuitry processes a measured repeatable runout (RRO) of a reference track to servo a first head at a substantially fixed location as the disk rotates, and then measures a stroke (or stroke difference) by moving the first and second heads toward the ramp from the fixed location.

In one embodiment, at least one of the disk surfaces (e.g., the first disk surface 16₁) comprises a plurality of eccentric tracks due, for example, to a non-centric alignment of the disks when clamped to a spindle motor. In one embodiment, the control circuitry 22 is configured to measure a repeatable runout (RRO) of a reference track representing the eccentricity of the reference track. The RRO of the reference track is processed to servo the first head at a substantially fixed location as the disk rotates. An example of this embodiment is illustrated in FIG. 7A wherein the first disk surface 16₁ may comprise an eccentric reference track 104. The RRO for this servo track 104 may be measured, for example, by evaluating the PES when servoing on the reference servo track 104. The control circuitry may then cancel the measured RRO from the PES so that the heads may be moved toward the ramp 20 from a fixed location 106 as the disk rotates. That is, the heads may be moved from a substantially concentric servo path 106 such as shown in FIG. 7A so that the heads move from essentially the same fixed location toward the ramp 20 regardless as to the rotation angle of the disk.

Figure 7B:
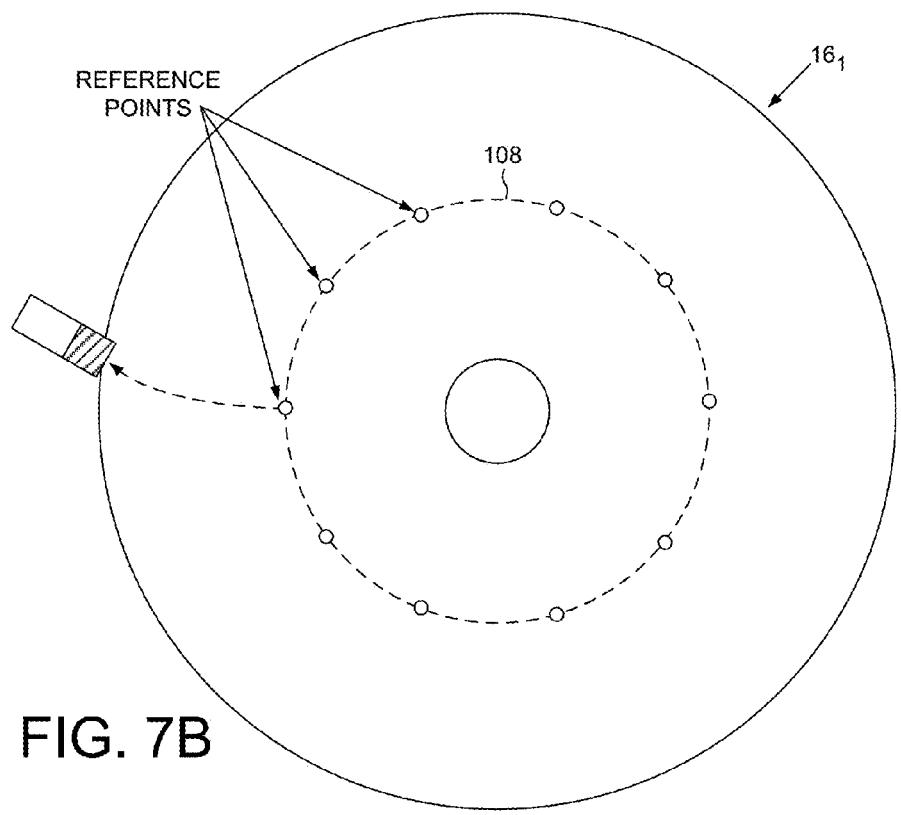
FIG. 7B shows an embodiment wherein the control circuitry measure a stroke (or stroke difference) multiple times by moving the first and second heads toward the ramp from a reference track starting from different rotation angles of the disk.

In another embodiment illustrated in FIG. 7B, the control circuitry 22 may be configured to measure the stroke difference between, for example, the first and second heads multiple times by moving the first and second heads toward the ramp 20 from a reference location 108 starting from different rotation angles of the disk. For example, in one embodiment the measured stroke difference between top and bottom heads may vary relative to the rotation angle of the disk due, for example, to a warping/wobbling of the disk.

In another embodiment, the control circuitry may measure the stroke of each individual head by moving the heads toward the ramp 20 from the reference location 108 multiple times starting from different rotation angles of the disk such as shown in FIG. 7B. The difference in the measured stroke of each head relative to the rotation angle of the disk may be processed, for example, to measure the eccentricity of each disk (i.e., the in-plane runout of the disk such as shown in FIG. 7A). In another embodiment, the control circuitry may measure the stroke of each individual head at different rotation angles of the disk by moving the heads toward the ramp 20 starting from a fixed location 106 such as shown in FIG. 7A (i.e., after canceling the RRO of the eccentric reference track 104). In this manner, the difference in the stroke measurement for each head relative to the rotation angle of the disk may be processed, for example, to measure the vertical runout of the disk due, for example, to warping/wobbling of the disk.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a plurality of disk surfaces including a first disk surface and a second disk surface;
a first head actuated over the first disk surface;
a second head actuated over the second disk surface;
a ramp proximate an outer diameter of the disk surfaces; and
control circuitry configured to measure a stroke difference between the first and second heads by moving the first and second heads toward the ramp and detecting when the heads contact the ramp.

2. The data storage device as recited in claim 1, wherein the data storage device further comprises a voice coil motor (VCM) configured to actuate the heads over the disk surfaces, and control circuitry is further configured to:
while moving the first and second heads toward the ramp, periodically sample a back electromotive force (BEMF) voltage of the VCM to generate a BEMF sample sequence;
after the heads contact the ramp, post-process the BEMF sample sequence to estimate a distance of movement for each of the heads; and
measure the stroke difference based on the distance of movement for each of the heads.

3. The data storage device as recited in claim 2, wherein the control circuitry is further configured to:
post-process the BEMF sample sequence by filtering the BEMF sample sequence using a non-causal filter to generate a filtered BEMF sample sequence; and
estimate the distance of movement for each of the heads based on the filtered BEMF sample sequence.

4. The data storage device as recited in claim 1, wherein the control circuitry is further configured to:
while moving the first head and the second heads toward the ramp, toggle between evaluating a first contact signal generated by the first head and a second contact signal generated by the second head; and
measure the stroke difference between the first head and the second head based on when the first contact signal indicates contact with the ramp and when the second contact signal indicates contact with the ramp.

5. The data storage device as recited in claim 1, wherein the first disk surface comprises a plurality of eccentric tracks and the control circuitry is further configured to:
measure a repeatable runout (RRO) of a reference track on the first disk surface representing the eccentricity of the reference track;
process the RRO of the reference track to servo the first head at a substantially fixed location as the disk rotates; and
measure a stroke of the first head by moving the first head toward the ramp from the fixed location.

6. The data storage device as recited in claim 5, wherein the control circuitry is further configured to measure a stroke of the first head multiple times by moving the first head toward the ramp from the fixed location starting from different rotation angles of the disk.

7. The data storage device as recited in claim 1, wherein the control circuitry is further configured to measure a stroke of the first head multiple times by moving the first head toward the ramp from a reference location starting from different rotation angles of the disk.

8. The data storage device as recited in claim 1, wherein the first head comprises a first touchdown sensor, the second head comprises a second touchdown sensor, and while moving the first and second heads toward the ramp the control circuitry is further configured to:
sample a first contact signal generated by the first touchdown sensor to generate a first contact sample sequence;
sample a second contact signal generated by the second touchdown sensor to generate a second contact sample sequence;
real-time detect the first head contacting the ramp based on the first contact sample sequence;
when the first head contacting the ramp is real-time detected, disable the first touchdown sensor;
real-time detect the second head contacting the ramp based on the second contact sample sequence; and
when contact the second head contacting the ramp is real-time detected, disable the second touchdown sensor.

9. The data storage device as recited in claim 8, wherein the control circuitry is further configured to real-time detect the first head contacting the ramp based on:

$$\frac{\sum_{i=1+D}^{M+D}(x_n - x_{n-i})^2}{M}$$

where:
$x_n$ represents a sample of the first contact sample sequence at time n;
M represents a smoothing factor; and
D represents a transient exclusion offset.

10. The data storage device as recited in claim 8, wherein after moving the first and second heads toward the ramp the control circuitry is further configured to:
post-time detect the first head contacting the ramp based on the first contact sample sequence; and
post-time detect the second head contacting the ramp based on the second contact sample sequence.

11. The data storage device as recited in claim 8, wherein the control circuitry is further configured to post-time detect the first head contacting the ramp based on:

$$LPF(n) = \frac{\sum_{i=1}^{M}(x_n - x_{n-i})}{M} \text{ and } RPF(n) = \frac{\sum_{i=1}^{M}(x_n - x_{n+i})}{M}$$

where:
$x_n$ represents a sample of the first contact sample sequence at time n; and
M represents a smoothing factor.

12. The data storage device as recited in claim 11, wherein the control circuitry is further configured to post-time detect the first head contacting the ramp based on a difference between LPF(n) and RPF(n).

13. The data storage device as recited in claim 12, wherein the control circuitry is further configured to post-time detect the first head contacting the ramp based on when the difference between LPF(n) and RPF(n) reaches an extremum.

14. A method of operating a data storage device, the method comprising:
moving first and second heads over respective disk surfaces to generate a contact signal; and
measuring a stroke difference between the first and second heads by detecting when the heads contact a ramp based on the contact signal.

15. The method as recited in claim 14, further comprising:
while moving the first and second heads toward the ramp, periodically sampling a back electromotive force (BEMF) voltage of the VCM to generate a BEMF sample sequence;
after the heads contact the ramp, post-processing the BEMF sample sequence to estimate a distance of movement for each of the heads; and
measuring the stroke difference based on the distance of movement for each of the heads.

16. The method as recited in claim 15, further comprising:
post-processing the BEMF sample sequence by filtering the BEMF sample sequence using a non-causal filter to generate a filtered BEMF sample sequence; and
estimating the distance of movement for each of the heads based on the filtered BEMF sample sequence.

17. The method as recited in claim 14, further comprising:
while moving the first head and the second heads toward the ramp, toggling between evaluating a first contact signal generated by the first head and a second contact signal generated by the second head; and
measuring the stroke difference between the first head and the second head based on when the first contact signal indicates contact with the ramp and when the second contact signal indicates contact with the ramp.

18. The method as recited in claim 14, wherein the first disk surface comprises a plurality of eccentric tracks and the method further comprises:
measuring a repeatable runout (RRO) of a reference track on the first disk surface representing the eccentricity of the reference track;
processing the RRO of the reference track to servo the first head at a substantially fixed location as the disk rotates; and
measuring a stroke of the first head by moving the first head toward the ramp from the fixed location.

19. The method as recited in claim 18, further comprising measuring a stroke of the first head multiple times by moving the first head toward the ramp from the fixed location starting from different rotation angles of the disk.

20. The method as recited in claim 14, further comprising measuring a stroke of the first head multiple times by moving the first head toward the ramp from a reference location starting from different rotation angles of the disk.

21. The method as recited in claim 14, wherein while moving the first and second heads toward the ramp the method further comprises:
sampling a first contact signal generated by a first touchdown sensor of the first head to generate a first contact sample sequence;
sampling a second contact signal generated by a second touchdown sensor of the second head to generate a second contact sample sequence;
real-time detecting the first head contacting the ramp based on the first contact sample sequence;
when the first head contacting the ramp is real-time detected, disabling the first touchdown sensor;
real-time detecting the second head contacting the ramp based on the second contact sample sequence; and
when contact the second head contacting the ramp is real-time detected, disabling the second touchdown sensor.

22. The method as recited in claim 21, further comprising real-time detecting the first head contacting the ramp based on:

$$\frac{\sum_{i=1+D}^{M+D}(x_n - x_{n-i})^2}{M}$$

where:
$x_n$ represents a sample of the first contact sample sequence at time n;
M represents a smoothing factor; and
D represents a transient exclusion offset.

23. The method as recited in claim 21, wherein after moving the first and second heads toward the ramp the method further comprises:
post-time detecting the first head contacting the ramp based on the first contact sample sequence; and
post-time detecting the second head contacting the ramp based on the second contact sample sequence.

24. The method as recited in claim 21, further comprising post-time detecting the first head contacting the ramp based on:

$$LPF(n) = \frac{\sum_{i=1}^{M}(x_n - x_{n-i})}{M} \text{ and } RPF(n) = \frac{\sum_{i=1}^{M}(x_n - x_{n+i})}{M}$$

where:
$x_n$ represents a sample of the first contact sample sequence at time n; and
M represents a smoothing factor.

25. The method as recited in claim 24, further comprising post-time detecting the first head contacting the ramp based on a difference between LPF(n) and RPF(n).

26. The method as recited in claim 25, further comprising post-time detecting the first head contacting the ramp based on when the difference between LPF(n) and RPF(n) reaches an extremum.

\* \* \* \* \*